US007958947B2

(12) United States Patent
Larsson et al.

(10) Patent No.: US 7,958,947 B2

(45) Date of Patent: Jun. 14, 2011

(54) DAMPING AND DRILLING MACHINE INCLUDING SUCH A DAMPING DEVICE

(75) Inventors: Per-Erik Larsson, Örebro (SE); Thomas Östling, Eskilstuna (SE)

(73) Assignee: Atlas Copco Rock Drills AB, Orebro (SE)

( * ) Notice: Subject to any disclaimer, the term of this patent is extended or adjusted under 35 U.S.C. 154(b) by 247 days.

(21) Appl. No.: 12/085,621

(22) PCT Filed: Dec. 6, 2006

(86) PCT No.: PCT/SE2006/001387

§ 371 (c)(1), (2), (4) Date: May 27, 2008

(87) PCT Pub. No.: WO2007/073275

PCT Pub. Date: Jun. 28, 2007

(65) Prior Publication Data

US 2009/0194336 A1 Aug. 6, 2009

(30) Foreign Application Priority Data

Dec. 22, 2005 (SE) .................................... 0502863

(51) Int. Cl.
*B25D 9/00* (2006.01)
*B23B 45/16* (2006.01)

(52) U.S. Cl. ....................................... 173/210; 173/200

(58) Field of Classification Search .................... 173/17, 173/200, 210, 212

See application file for complete search history.

(56) References Cited

U.S. PATENT DOCUMENTS

| | | | | | |
|---|---|---|---|---|---|
| 3,945,442 | A * | 3/1976 | Amtsberg | 173/10 |
| 4,073,350 | A * | 2/1978 | Eklof et al. | 173/212 |
| 4,340,121 | A * | 7/1982 | Bailey et al. | 173/206 |
| 4,494,614 | A * | 1/1985 | Eklof | 173/200 |
| 5,715,897 | A * | 2/1998 | Gustafsson | 175/296 |
| 5,896,937 | A * | 4/1999 | Kaneko | 173/211 |
| 6,186,246 | B1 * | 2/2001 | Muuttonen et al. | 173/1 |
| 6,318,478 | B1 * | 11/2001 | Kaneko | 173/4 |
| 6,994,175 | B2 * | 2/2006 | Egerstrom | 175/296 |
| 7,032,684 | B2 * | 4/2006 | Muuttonen et al. | 173/4 |
| 7,419,015 | B2 * | 9/2008 | Muuttonen et al. | 175/296 |

FOREIGN PATENT DOCUMENTS

| | | |
|---|---|---|
| EP | 0856637 | 8/1998 |
| WO | 2004 4060617 | 7/2004 |

* cited by examiner

*Primary Examiner* — Rinaldi I Rada
*Assistant Examiner* — Gloria R Weeks
(74) *Attorney, Agent, or Firm* — Mark P. Stone

(57) ABSTRACT

A damping device for inserting into a housing of an impulse producing drill machine, for damping Shockwave reflexes from a drill string connected to the drilling machine, is distinguished in that a first damping piston (7) for direct or indirect action against the drill string and for applying a pressure in the direction of the drill string an a second damping piston (9) for applying pressure in the direction against the drill string against a fixed stop (11) arranged in the housing, wherein the first (7) and the second damping piston (9) are arranged to co-operate for joint damping action with a drill bushing or shank adapter in a certain relative position. The invention also concerns a drilling machine.

19 Claims, 2 Drawing Sheets

1
3
2

20
15
13
A1
14
P
19
9
7
16
17
11
5
4
T1
T2
12
6

DAMPING AND DRILLING MACHINE INCLUDING SUCH A DAMPING DEVICE

FIELD OF THE INVENTION

The invention concerns a damping device according to the preamble of claim 1 and a drilling machine including such a damping device.

BACKGROUND OF THE INVENTION

In drilling machines for rock drilling having a drill string and a drill bit at its distal end, the drill string adjoins to a drilling machine over an adapter, having its axial contact with the drilling machine against a drill bushing. In a previously known percussion drilling machine with rotation means, the contact between the adapter and the drill bushing is typically achieved through contact of the latter against axial ends of the rotational splines of the adapter.

Against the end of the drill bushing which is turned away from the drill string, acts the so called damping piston, which functions so as to transfer the feed force against the rock from the machine housing to the drill bushing and further over the adapter, over the drill string to the drill bit for contact thereof against the rock. According to previously known art, the damping piston is preloaded through the hydraulic/pneumatic spring being comprised of hydraulic fluid in a chamber, which often has a connection to a hydraulic/pneumatic accumulator.

If the shockwave produced by the percussion piston through the drill string is not adapted to the impedance of the rock, the result will be reflexes back through the drill string. A reflex often includes a tensile stress portion as well as a compressive stress portion. If the rock is hard in relation to the shockwave force, the result will in general be compressive reflexes, having amplitudes twice the size of the incoming shockwave. If, on the contrary, the rock is soft or if the drill bit has inferior contact with the rock, tensile waves having essentially the same amplitude as the incoming shockwave will be reflected.

The compressive reflexes force the drill bushing and the damping pistons in the direction from the drill string, whereby hydraulic oil is charged into the accumulator. The pressure therein then presses back the damping piston and the bushing to the original position against a mechanical stop in the machine housing. Resilience in the accumulator thus provides an elastic function, which protects the drilling machine against high stresses and vibrations. This increases the working life of the drilling machine and makes is possible to transfer greater effects.

Tensile reflexes can not be handled directly by damping systems of the older type. A sudden cavity in the rock can thus result in that the drill string for a short while separates from the drilling machine. This results in ineffective drilling.

In a so called floating damper, there exists a constant hydraulic fluid flow through the damping chamber. In this arrangement the pressure is temporarily reduced in the damper if the damping piston passes a floating position in the direction of the drill string. The feed force can then more effectively reset the floating position by displacement of the machine housing in the direction of the drill string such that a better contact with the drill string is obtained. A problem with this kind of arrangement is the increased energy consumption which is caused by the need of a constant flow of hydraulic liquid.

With a so called single damper, the damping piston is actuated in the drilling direction of a volume pressurized to the pressure of the percussion device against a fixed end stop in the machine housing. In particular in case of low feeding force, contact between the damping piston and the shank adapter is lost already before the strike occurs. Reflected shock wave energy from the rock result in that the damping piston receives a speed backwardly in the machine housing, where after, following a shift of the damping piston forwards, it strikes with essentially the same speed against the shank adapter and its' end stop. Also during this movement, there is a lack of transfer of feeding force to the drill string and thereby rotational resistance.

In a variant of the single damper, the damping piston is balanced around a floating position, which is determined by a constant oil flow. This solution allows that the damping piston is capable to follow the shank adapter for enhanced rock contact at the cost of an increased consumption of effect.

In a so called double damper, the damping piston has two pressurized areas. One of these areas exists in a confined volume which acts as a throttle damper, and which transforms reflected energy of a certain magnitude into heat in the hydraulic oil when it passes through a throttling slot. Also double dampers can be made floating around a floating position.

As background art can be mentioned EP 0856 657 A1 and WO2004060617 A1.

Altogether, damping systems according to the background art have resulted in that fast reaction and good energy absorption has been able to obtain at the expense of a certain energy consumption. More energy saving damping devices have, however, resulted in slow systems with relatively long periods without contact between a damping piston and the adapter, resulting in that during considerable periods, no feeding force has been transferred to the drilling steel, whereby no tightening of joints occurs in the drill string and ineffective drilling will be the result.

AIM AND MOST IMPORTANT FEATURES OF THE INVENTION

It is an aim of this invention to provide a damping device, wherein the problems with the background art are solved or at least reduced. In particular it is an aim to provide a damping device which is fast as well as energy saving.

This aim is obtained in a damping device of the kind mentioned above through the features of the characterizing portion of claim 1.

Hereby it is achieved that the first damping piston can be dimensioned such that a feeding force on the machine housing, in advance positions of this damping piston, is capable of pressing this first damping piston backwardly in the direction of the second damping piston. The function of the first damping piston will thereby be to, when it is necessary, follow the drill string forwardly in order to obtain rock contact for the drill bit. This results in contact with the machine and better tightening of joints etc.

The second damping piston operates in principle as a conventional single damper. It has the function to protect the machine against harmful shockwaves reflected from the rock, which have such force that they press the first damping piston to retracted positions, wherein both damping pistons, exerts a force on the drill string. It has further a function to achieve a defined striking position, which contributes to better percussion machine power.

Hereby is obtained a great number of advantages, namely that the machine is effectively protected, against reflected shock waves. The system can be made fast so that the machine can quickly follow the drill string and in particular the adapter forwards for achieving a good tightening of joints. An almost unequivocal striking position is defined for the machine whereas the energy consumption for the damping device is reduced.

The second damping piston is thus arranged for applying pressure in the direction against the drill string against a stop which is arranged fixed in the housing, whereas the first damping piston is moveable between advance positions, as seen in the direction of the drill string, wherein it can alone exert a force against the drill string and retracted positions, wherein it can co-operate with the second damping piston in order to together exert force against the drill string. In particular the first damping piston as well as the second damping piston is constructed to act against the drill string directly or indirectly over a drill bushing and/over a shank adapter. This has the advantage that a desired "tandem" effect will be achieved since the first damping piston is allowed to move with its contact surface axially past the contact surface of the second damping piston and exert its damping action with the smaller force, until the drill bushing and/or the shank adapter by the drill string has been pressed to a position where the drill bushing and/or the shank adapter have also come into contact with the second damping piston, which is pressed against a fixed stop. In further movement of the drill bushing and/or the shank adapter in the direction from the drill string, damping cooperation with both damping pistons will occur.

In case of concentrically positioned damping pistons according to the invention, the advantage of saving room is obtained in an axial direction, which results in that the entire drilling machine construction can be made relatively short. By the construction according to the invention it is possible also that none of the damping devices according to the invention consumes any power, since no continuous oil flow according to the above is necessary.

In a preferred embodiment of the invention, at least one of said first and second damping pistons is provided with a throttling damping portion for absorbing energy, which has been reflected. This gives a further advantageous function of the damping device according to the invention. In particular it is preferred that it is the first damping piston that is provided with said throttling damping portion for adjusted damping of reflected shockwaves of a greater magnitude.

Corresponding advantages are obtained in a drilling machine including such a damping device. Further features and advantages result from the further claims, and will be explained below.

BRIEF DESCRIPTION OF DRAWINGS

The invention will now be described closer by way of embodiment and with reference to the annexed drawing, wherein.

DESCRIPTION OF EMBODIMENT

Figure 1:
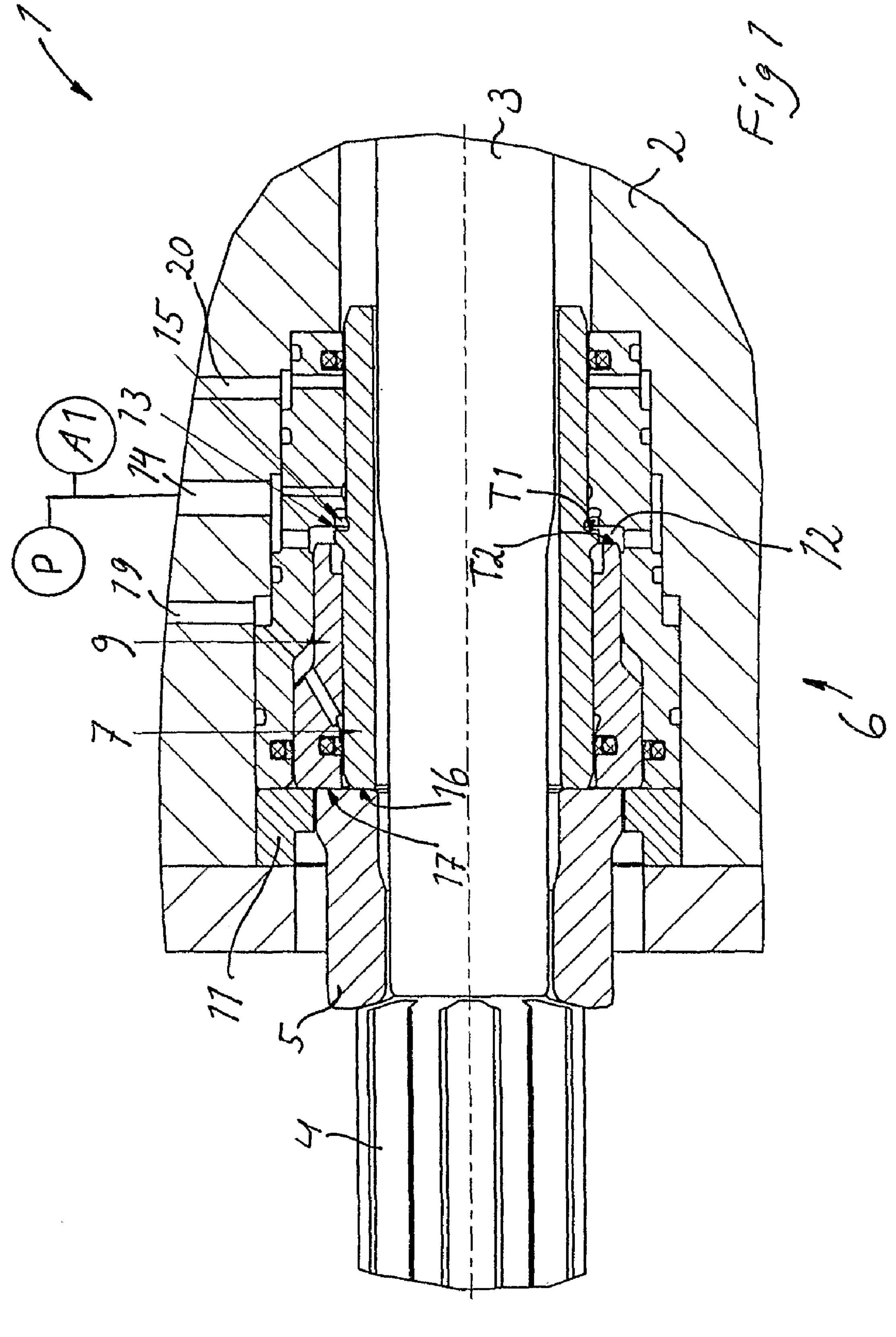
FIG. 1 diagrammatically in a axial section shows a detail of an embodiment of a rock drilling machine according to the invention.

In FIG. 1 is shown a detail 1 of a percussion drilling machine including a part 2 of a housing, wherein a percussive piston 3 is moveable to-and-fro in a per se previously known manner. The percussion piston 3 acts by striking against the upper end of a shank adapter 4, whereto are connected not shown drill string elements and, most distal, a not shown drill bit.

On a surface radially outside the stroke-receiving end surface, the shank adapter 4 provides a contact surface for a drill bushing 5, which in turn, on its other end, is actuated by a damping device 6.

The damping device 6 includes according to the invention a first damping piston 7, which contacts directly against said drill bushing 5, and which has a pressure surface T1 positioned inside a damping volume (or damping chamber) 12. The damping volume 12 is over a hydraulic oil channel 14 in connection with a pressure source P and a hydraulic/pneumatic accumulator A1, through which is maintained a damping pressure $P_{d1}$ in the hydraulic oil channel 14 and inside the damping volume 12. In an alternative embodiment, at least the accumulator A1 is omitted.

Radially outside the first damping piston 7 is arranged a second damping piston 9 which has a pressure surface T2 located inside the damping volume (or damping chamber) 12 and which is greater that the pressure surface T1.

Typically the pressure in the hydraulic oil channel 14 is the working pressure of the percussion device or at least a relatively high pressure. The volume 12 can this way preferably be connected to a feeding channel for the percussion device.

The second damping piston can be pressed with great force against its end stop. On the first damping piston is however acting a smaller force because of a smaller pressure area T1 than the pressure area T2.

Figure 2:
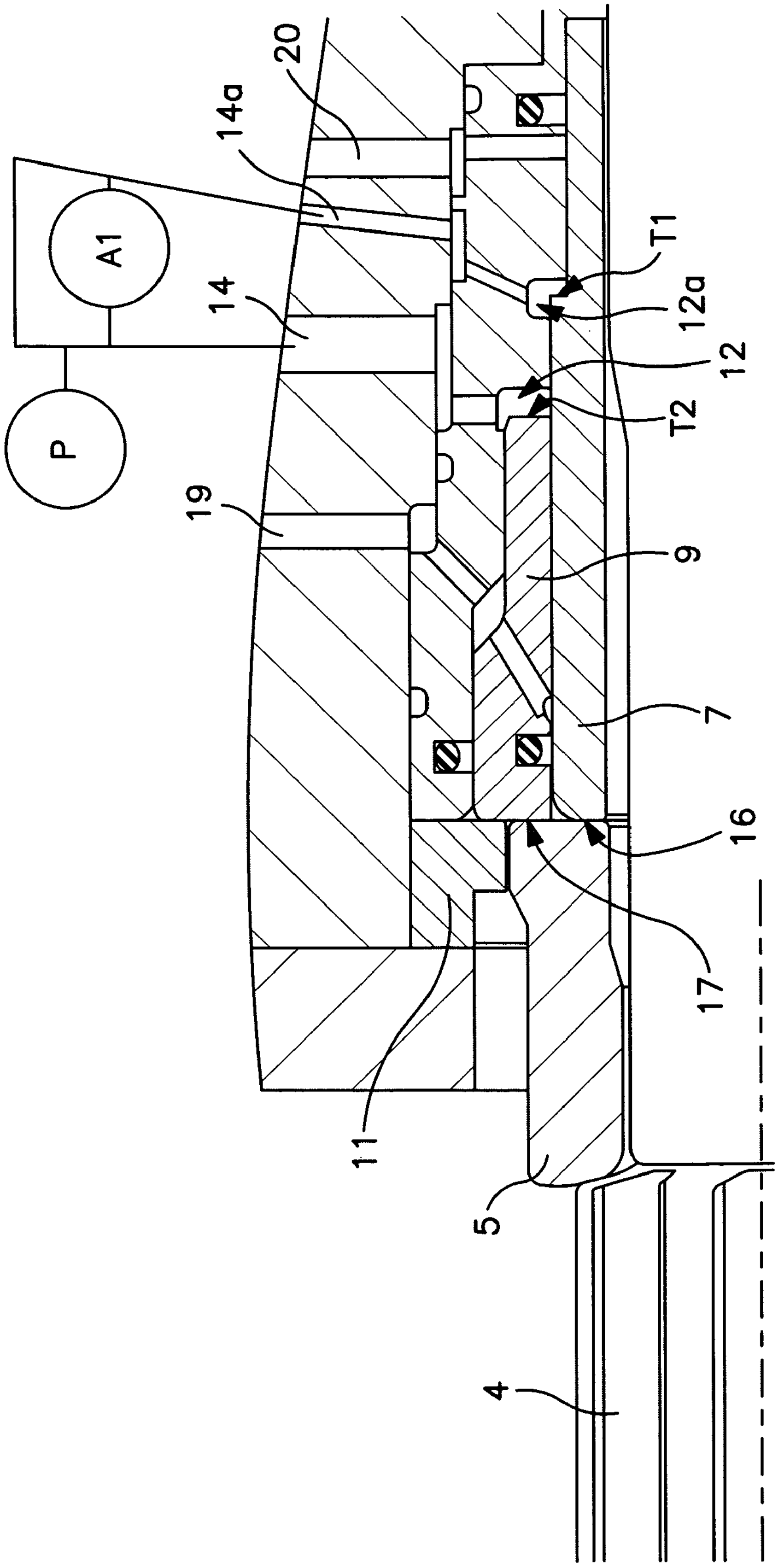
FIG. 2 illustrates a portion of FIG. 1 showing an alternative embodiment of the invention.

As an alternative embodiment illustrated by FIG. 2, the pressure surface T1 and T2 can be received in different separate damping volumes designated by reference numerals 12*a* and 12 in FIG. 2, whereby each one of these damping volumes, over a hydraulic oil channel, is in communication with the pressure source and possibly with a hydraulic/pneumatic accumulator through channels 14*a* and 14, respectively. When using separate damping volumes, preferably hereby a relatively high pressure, such as the working pressure of the percussion device acts upon the second damping piston 9, whereas a second damping pressure $P_{d2}$, which is relative lower, is arranged to act on the first damping piston 7. Also in case of separate damping volumes, however, the same pressure can actuate both damping pistons.

With 11 is indicated a fixed stop arranged in the housing 2, which comprises an axially fixed end stop in the direction against the adapter 4 in the drilling machine housing for the second damping piston 9.

The function with the damping device 6 according to the invention is thus that the second damping piston 9 in principle works as a conventional single damper. It is thus pressed with a great force, through the pressure prevailing in the damping volume 12, against this end stop. Hereby it is possible to fulfil the function on the one hand to protect the machine against harmful shockwaves that are reflected from the rock, when the first damping piston is pressed to retracted positions, on the other hand to achieve an unequivocal striking position for the percussion device of the drilling machine.

The first damping piston 7 is pressurized in the damping volume 12 with a pressure such that it is actuated by a force which is chosen such, by dimensioning the area of the damping volume T1 or the magnitude of the pressure, that the feeding force on the drilling machine housing in operation has the capacity of pressing the latter forward, and thereby the first damping piston 7 backwardly, with respect to the drilling machine housing, until also the second damping piston 9 comes to contact against the drill bushing 5. This is the position which is shown on FIG. 1.

With movements of the drill bushing axially to the right, past the position in FIG. 1, a damping co-operation will be formed with both the first damping piston 7 and the second damping piston 9 as is described above.

The task for the first damping piston is to, when necessary, quickly follow the shank adapter forwards in order to maintain the contact with that element so as to achieve better joint tightening in the drill string.

A great advantage with the construction according to the invention is that the damping device 6 according to the present invention does not require any continuous oil flow, and thereby does not consume any corresponding power.

According to the invention, a damping system is thus achieved which eliminates or reduces the drawbacks of the background art and at the same time result in the following advantages. The machine is protected against shockwaves reflected from the rock. The system quickly follows when required forwards after the shank adapter and gives a possibility of effective joint tightening. The system makes it possible to have a virtually unequivocal striking position and is power saving.

Advance positions are such where the first damping piston is displaced in the drilling direction from the position shown in FIG. 1 and alone can exert force against the drill string. Retracted positions are such where the first damping piston is displaced opposite to the drilling direction from the position shown in FIG. 1 and the first and the second damping piston together can exert force against the drill string.

In the embodiment according to the figure, the first damping piston 7 has an outwardly positioned step 13, which goes in an associated damping volume 15 for forming a throttling damping portion for energy absorption. This is an optional arrangement. According to the invention as the case can be, such a throttling damping portion is omitted.

This portion can, in order to cool off heat from transformed reflected shockwave energy, according to an also optional arrangement, be fed through the common channel 14 with a minor leak flow in the form of a hydraulic oil flow, which is allowed to leak through appropriately dimensioned slots against adjacent elements and finally through the leak channels 19 and 20 for cooling the associated parts. The leak flow is allowed through smaller slots between the damping pistons on the one hand and between the damping pistons and a housing insert 18.

An important aspect, which is shown in FIG. 1, is that both damping pistons act directly against the drill bushing 5 and further are independent of each other in their operational zones. This means that they do not interfere with each other during the damping function. A desired "tandem"-effect is achieved by the first damping piston 7 being allowed to move with its contact surface 16 axially past the contact surface 17 of the second damping piston 9 and exert its damping effect with the smaller force, until the drill bushing by the drill string has been pressed to the position shown in the figure, where the drill bushing has also come into contact with the second damping piston, which is pressed against the fixed stop 11. With further movement of the drill busing in the direction from the drill string, damping cooperation will result with both damping pistons.

It is not excluded that the invention is modified within the scope of the following claims. Hereby the included elements can be constructed differently, for example such that each one of both the first and the second damping piston is provided with a throttling damping portion for energy absorption. Further variations of the damping pistons can be envisaged, for example that the first damping piston completely or partially surrounds the second damping piston.

Effective areas of piston means and volumes are adapted to the requirements that prevail in the application at hand. Hereby are considered parameters such as physical dimensions of different parts of the drilling machine, pressure levels etc.

The invention has been described at the background of an impulse generating unit in the form of a percussion device having a to-and-fro movable percussion piston. The invention is however adaptable also for drilling machines including other types of impulse producers, such as piston-free impulse machines, that produce impulses in a drill string by different methods such as a very fast introduction of a liquid under pressure into a chamber including a transmission means, pre-loading and sudden releasing of an element such as a metal rod etc.

The invention claimed is:

1. Damping device for inserting into a housing of an impulse producing drilling machine, for damping shockwave reflexes from a drill string connected to the drilling machine and including a first damping piston (7) for direct or indirect action against the drill string and for applying a pressure in the direction of the drill string, said damping device further including:

a second damping piston (9) for applying pressure in the direction against the drill string against a fixed stop (11) arranged in the housing, wherein the first and second damping pistons are movable independent of each other in their respective working areas and arranged such that movement of one said damping piston in said working area thereof does not cause movement of said other damping piston in said working area thereof, and wherein the first damping piston (7) is movable between advance positions, as seen in a direction of the drill string, in which only said first damping piston exerts a force against the drill string, and retracted positions, in which said first damping piston cooperates with the second damping piston (9) to jointly exert force against the drill string, and wherein the first damping piston and the second damping piston are each adapted to act against the drill string directly, or to act against the drill string indirectly over a drill bushing (5), a shank adapter (4) or both.

2. Damping device according to claim 1, wherein the first (7) and the second (9) damping pistons are arranged so that one at least partly surrounds the other one.

3. Damping device according to claim 2, wherein at least one of said first and second damping pistons includes a throttling damping portion (13, 15) for energy absorption.

4. Damping device according to claim 3, wherein said damping device is adapted such that in operation, the force resulting from applied pressure and acting on the first damping piston (7) is smaller than the force produced by applied pressure acting on the second damping piston (9).

5. Damping device according to claim 2, wherein said damping device is adapted such that in operation, the force resulting from applied pressure and acting on the first damping piston (7) is smaller than the force produced by applied pressure acting on the second damping piston (9).

6. Drilling machine with an impulse producing unit inside a housing, including a damping device according to claim 2.

7. Drilling machine according to claim 6, wherein the impulse unit includes a to-and-fro moveable percussive piston.

8. Damping device according to claim 1 wherein at least one of said first and second damping pistons includes a throttling damping portion (13, 15) for energy absorption.

9. Damping device according to claim 8, wherein said damping device is adapted such that in operation, the force resulting from applied pressure and acting on the first damping piston (7) is smaller than the force produced by applied pressure acting on the second damping piston (9).

10. Drilling machine with an impulse producing unit inside a housing, including a damping device according to claim 8.

11. Drilling machine according to claim 10, wherein the impulse unit includes a to-and-fro moveable percussive piston.

12. Damping device according to claim 1, wherein said damping device is adapted such that in operation, the force resulting from applied pressure and acting on the first damping piston (7) is smaller than the force produced by applied pressure acting on the second damping piston (9).

13. Damping device according to claim 12, wherein the area of a pressure surface (T1) on the first damping piston intended for pressure application is smaller than the area of a pressure surface (T2) on the second damping piston intended for pressure application.

14. Damping device according to claim 13, wherein the pressure surface (T1) and the pressure surface (T2) are positioned in one common chamber.

15. Damping device according to claim 13, wherein the pressure surface (T1) and the pressure surface (T2) are positioned each in a separate chamber.

16. Damping device according to claim 1, wherein used hydraulic medium is passed to the damping device from an impulse producing unit.

17. Damping device according to claim 1, wherein guides for damping pistons are constructed with smaller slots for allowing a smaller, cooling leak flow.

18. Drilling machine with an impulse producing unit inside a housing, including a damping device according to claim 1.

19. Drilling machine according to claim 18, wherein the impulse unit includes a to-and-fro moveable percussive piston.

* * * * *